United States Patent
Qiang et al.

(10) Patent No.: US 8,331,314 B2
(45) Date of Patent: Dec. 11, 2012

(54) DORMANT SESSION MANAGEMENT ASSOCIATED WITH HANDOVER

(75) Inventors: Zu Qiang, Kirkland (CA); Octavio Lima, The Colony, TX (US); Gunnar Mildh, Sollentuna (SE); Anders Lundstrom, Sollentuna (SE); Samy Touati, Rosemere (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 988 days.

(21) Appl. No.: 12/044,422

(22) Filed: Mar. 7, 2008

(65) Prior Publication Data

US 2008/0259876 A1    Oct. 23, 2008

Related U.S. Application Data

(60) Provisional application No. 60/913,157, filed on Apr. 20, 2007.

(51) Int. Cl.
 *H04W 4/00* (2009.01)
(52) U.S. Cl. .......................... 370/331; 455/436
(58) Field of Classification Search .......... 370/328–333; 455/436–441
See application file for complete search history.

(56) References Cited

U.S. PATENT DOCUMENTS

| | | | |
|---|---|---|---|
| 6,701,152 B1 * | 3/2004 | Cohen et al. | 455/437 |
| 2001/0009543 A1 | 7/2001 | Park et al. | |
| 2002/0071404 A1 | 6/2002 | Park et al. | |
| 2003/0099214 A1 * | 5/2003 | Schmidt et al. | 370/328 |
| 2003/0171117 A1 * | 9/2003 | Wang et al. | 455/436 |
| 2005/0130659 A1 | 6/2005 | Grech et al. | |
| 2005/0276273 A1 * | 12/2005 | Oprescu-Surcobe et al. | 370/329 |
| 2006/0109818 A1 * | 5/2006 | Ramanna et al. | 370/331 |
| 2006/0203743 A1 * | 9/2006 | Quinn et al. | 370/329 |
| 2007/0036109 A1 | 2/2007 | Kwak et al. | |
| 2007/0237114 A1 * | 10/2007 | Mehta et al. | 370/331 |
| 2007/0249352 A1 * | 10/2007 | Song et al. | 455/436 |
| 2008/0026761 A1 | 1/2008 | Usuda et al. | |

FOREIGN PATENT DOCUMENTS

| | | |
|---|---|---|
| EP | 1 662 726 A1 | 5/2006 |
| WO | 99/31918 | 6/1999 |
| WO | 2004/047479 A2 | 6/2004 |
| WO | 2004/079967 | 9/2004 |

OTHER PUBLICATIONS

Patent Abstracts of Japan, Publication No. 2003-032133, Date of publication Jan. 31, 2003, Inventor Hiroaki, 1 page.

* cited by examiner

*Primary Examiner* — Steven H Nguyen
(74) *Attorney, Agent, or Firm* — Ericsson Canada Inc.; Alex Nicolaescu

(57) ABSTRACT

Systems and methods according to these exemplary embodiments provide for selectively transmitting a pre-registration, re-registration or de-registration initiation message associated with handing off user equipment between different access systems, e.g., a long term evolution (LTE) system and a high rate packet data (HRPD) system, to reduce dormant sessions. The decision to selectively transmit initiation messages is typically performed by a dormant session management function (DSMF).

24 Claims, 10 Drawing Sheets

DORMANT SESSION MANAGEMENT ASSOCIATED WITH HANDOVER

RELATED APPLICATION

This application is related to, and claims priority from, U.S. Provisional Patent Application 60/913,157 entitled "Dormant Session Management for LTE to HRPD Handover", filed on Apr. 20, 2007, the disclosure of which is incorporated here by reference.

TECHNICAL FIELD

The present invention relates generally to telecommunications systems, and in particular, to methods and systems for dormant session management during handover in radiocommunication systems.

BACKGROUND

Radiocommunication networks were originally developed primarily to provide voice services over circuit-switched networks. The introduction of packet-switched services in, for example, the so-called 2.5G and 3G networks enabled network operators to provide data services as well as voice services. Eventually, network architecture will evolve toward all-IP networks which provide both voice and data services. However, network operators have a substantial investment in existing infrastructure and would, therefore, typically prefer to migrate gradually to all-IP network architectures to allow them to extract sufficient value from their investment in existing infrastructures. In order to provide the capabilities needed to support next generation radiocommunication applications, while at the same time using legacy infrastructure, network operators will deploy hybrid networks wherein a next generation radiocommunication system is overlaid onto an existing circuit-switched or packet-switched network as a first step in the transition to an all IP-based network.

One example of such a hybrid network involves an existing 3GPP2 radiocommunication system, such as a high rate packet data (HRPD) system, onto which a next generation "long term evolution" (LTE) system is overlaid. As will be appreciated by those skilled in the art, HRPD systems are sometimes referred to by many different names or acronyms. For example, HRPD systems have sometimes been referred to as "high rate data" (HRD) systems or by reference to their air interface standard promulgated by TIA-EIA, i.e., IS-856. The IS-856 standard, entitled "cdma2000® High Rate Packet Data Air Interface Specification (2000)", which is available online at www.tiaonline.org, is incorporated here by reference. Additionally, since HRPD systems use a code division multiple access (CDMA) scheme and evolved from CDMA 2000, they are also sometimes referred to as "1xEV-DO" systems which refers to an "EVolution, Data-Only" version of CDMA 2000. Similarly, LTE systems refer to, for example, next generation (4G) wideband CDMA (WCDMA) systems which are intended to provide improved performance. Although not yet completely standardized, LTE systems will ultimately be designed in accordance with a new version of the UMTS standards, see, e.g., 3GPP TR 25.913 available online at www.3gpp.org. Target performance goals for LTE systems currently include, for example, support for 200 active calls per 5 MHz cell and sub 5 ms latency for small IP packets.

When an LTE system is overlaid onto an HRPD system, various types of inter-system interoperability will become desirable, one of which is handoff or handover. Inter-system handoff refers to, for example, the process whereby a mobile unit, e.g., a cellular telephone, wireless PDA or laptop, which is currently being supported by a first radiocommunication system is transferred to the support of a second radiocommunication system. In the context of this application, as shown conceptually in FIG. 1, an inter-system handoff of interest involves the transfer of communication support of user equipment (UE) 10, e.g., a mobile system, from an LTE access network 30 to an HRPD access network 20 or vice versa. Such handoffs may be performed for a variety of reasons. For example, a UE 10 which is currently being served by the LTE access network, 30 may have moved into a geographic area wherein it can be better served by the HRPD access network 20. Alternatively, the inter-system handoff may be performed to provide load balancing between the HRPD access network 20 and the LTE access network 30.

Regardless of the particular reason for the handoff various signaling needs to be performed in order to complete the transfer of support responsibility for the mobile unit 10 from or to the LTE access network 30. Of particular interest in this application, is the signaling associated with a pre-registration process (and other associated processes, e.g., re-registration and de-registration) that can occur prior to handoff from the LTE access network 30 to the HRPD access network 20 of UE 10. However, in cases where pre-registration does not result in a completed handoff prior to being terminated, a dormant or "ghost" session is typically created, which may be wasteful of radiocommunication system resources.

Accordingly, the exemplary embodiments described herein address the need for methods and systems to control the establishment of dormant sessions associated with the handover process for UE 10 from, e.g., the LTE access network 30 to the HRPD access network 20.

SUMMARY

Systems and methods according to the present invention address this need and others by providing techniques to reduce the number of dormant sessions associated with the handover process for user equipment (UE) from, e.g., a long term evolution (LTE) access network to high rate packet data (HRPD) access network.

According on an exemplary embodiment a method for selectively transmitting an initiation message, associated with handover of a user equipment (UE) from a long term evolution (LTE) radio access network (RAN) to a high rate packet data (HRPD) RAN, by a communication node includes: receiving inputs at the communication node; determining, based upon the received inputs, whether to transmit the initiation message; and selectively transmitting the initiation message based upon the determination, wherein the initiation message is one of a pre-registration, a re-registration and a de-registration message and includes a neighbor list, a UE location and a UE status.

According to another exemplary embodiment, a method for selectively transmitting a message from a user equipment (UE) in communications with a long term access (LTE) radio access network (RAN) includes: receiving an initiation message, wherein the initiation message is one of a pre-registration, re-registration and de-registration initiation message; determining, based on the received initiation message, to perform one of pre-registration, re-registration and de-registration; and selectively transmitting at least one message based upon said step of determining.

According to yet another exemplary embodiment, a method for transmitting an initiation message, associated with handover of a user equipment (UE) from a long term evolution (LTE) radio access network (RAN) to a high rate packet data (HRPD) RAN, by a communication node includes: receiving an initiation message, wherein the initiation message is one of pre-registration, re-registration and de-registration initiation message and includes a neighbor list, a UE location and a UE status; and transmitting a message toward the UE.

According to still another exemplary embodiment a communication node includes: a communications interface for receiving inputs; memory for storing the inputs; a processor for determining, based upon the inputs, whether to transmit an initiation message, wherein the communication node selectively transmits the initiation message, further wherein the initiation message is one of a pre-registration, a re-registration and a de-registration initiation message and includes a neighbor list, a user equipment (UE) location and a UE status.

BRIEF DESCRIPTION OF THE DRAWINGS

The accompanying drawings illustrate exemplary embodiments of the present invention, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
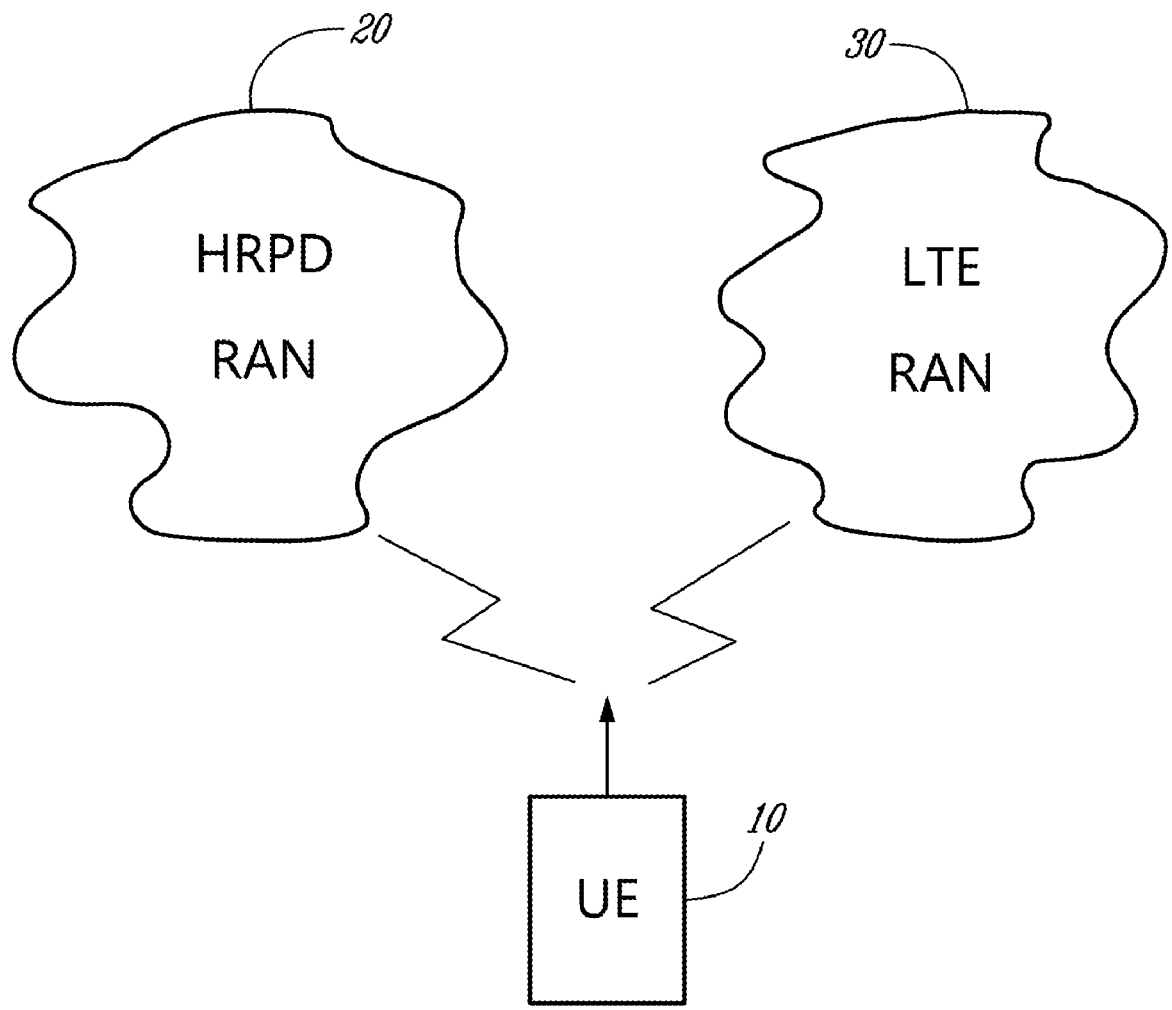
FIG. 1 illustrates handoff of a user equipment (UE) between a long term evolution (LTE) radio access network (RAN) and a high rate packet data (HRPD) RAN.
Figure 2A:
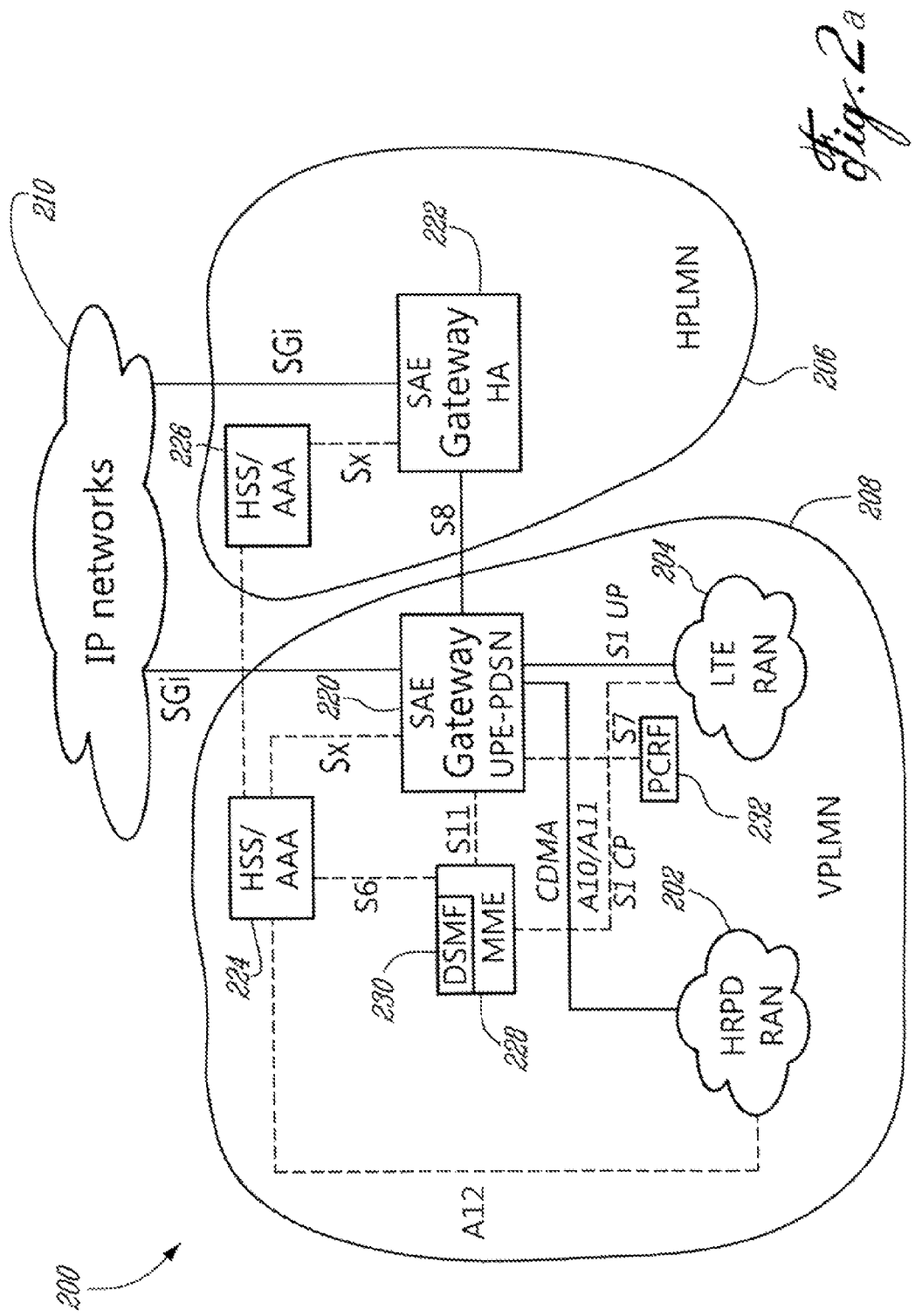
FIG. 2(a) illustrates a hybrid radio access network using an IP Multimedia System (IMS) architecture according to an exemplary embodiment.
Figure 2B:
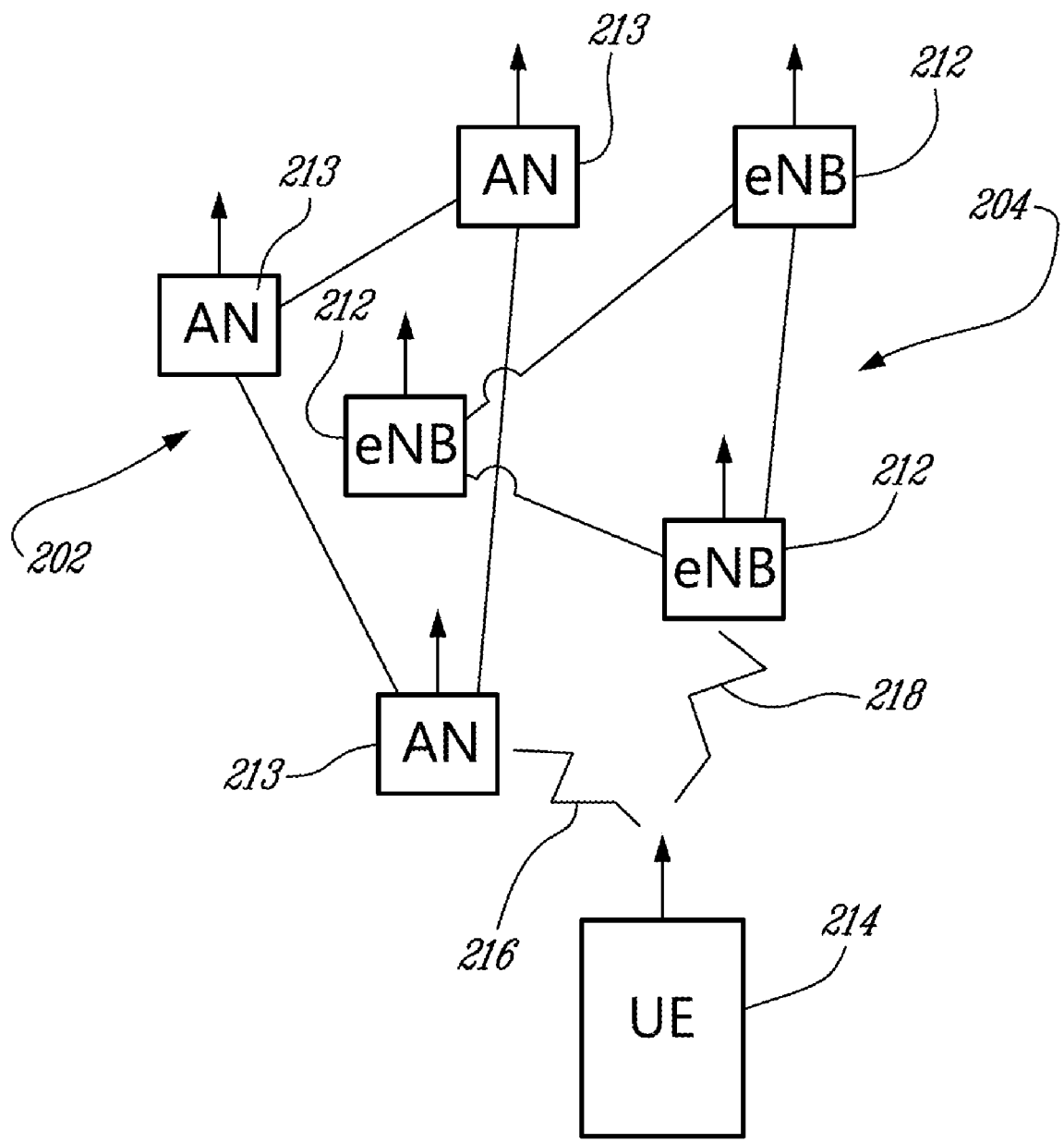
FIG. 2(b) illustrates the exemplary hybrid radio access network of FIG. 2(a) in more detail.

As mentioned above, it is desirable to provide mechanisms and methods for handing off connections between an LTE access network and an HRPD access network. Accordingly, to provide some context for this discussion, an exemplary hybrid system 200 which includes both an HRPD (3GPP2) access network 202 and an LTE access network 204 is provided as FIGS. 2(a) and 2(b) and will now be described. For generality, and to facilitate the handoff discussions below, the hybrid system 200 includes both a home public land mobile network (HPLMN) 206 and a visited public land mobile network (VPLMN) 208, as well as various IP networks 210 (e.g., including the Internet) to which the radio networks are connected. Each access network 202 and 204 includes a number of base stations 213 and 212, respectively, as seen in FIG. 2(b) for providing radio access to user equipment (UE) 214 via air interfaces 216 and 218, respectively, which are individually specified for the respective access networks. More specifically, the air interface 216 is specified by the above-incorporated by reference IS-856 standard and the as yet to be completely standardized air interface 218 is expected to include, for example, an orthogonal frequency division multiple access (OFDMA) downlink and a single carrier frequency division multiple access (SC-FDMA) uplink. Notationally, HRPD base stations 213 are typically referred to as "access nodes" (ANs), while LTE base stations 212 are typically referred to as "evolved Node B's" (eNBs). The radio access networks 202 and 204 may, in addition to base stations 213, 212, include other functional entities such as packet control functions (PCFs) which are not shown in FIGS. 2(a) and 2(b) to simplify the illustration.

Returning to FIG. 2(a), the elements of both the HRPD access network 202 and the LTE access network 204 are, according to this exemplary embodiment, connected to an integrated system architecture evolution (SAE) gateway (GW)-user plane entity (UPE)/PDSN 220. The PDSN aspect of element 220 refers to the HRPD element which interconnects the IP networks 210 with the radio access network 202 via an A10/A11 interface or reference point, as well as providing interconnectivity to other PDSNs (not shown) in the HRPD portion of the hybrid system 200. The A interfaces/reference points associated with the HRPD portion of the hybrid network 200 and shown in FIG. 2(a) are specified in, for example, TIA-878-A (A.S0008) and TIA-1878-A (A.S0009), available at www.tiaonline.org, the disclosures of which are incorporated here by reference. Additionally, the PDSN aspect of element 220 is in communication via an S7 interface with a policy and charging rules function (PCRF) 232 which performs duties related to policy control decisions and flow based charging control.

Similarly, the SAE GW-UPE aspect of element 220 refers to the LTE element which interconnects the IP networks 210 with the radio access network 204 via S1 and SGi interfaces, as well as providing interconnectivity to other SAE GWs in the LTE portion of the hybrid system 200, e.g., the home gateway 222. The S interfaces/reference points associated with the LTE portion of the hybrid network 200 and shown in FIG. 2(a) are specified in, for example, the standards document 3GPP TS 23.402. Additionally, SAE GW-UPE/PDSN 220 and SAE GW 223 are connected to integrated home subscriber services (HSS)/authentication, authorization and accounting (AAA) servers 224 and 226, respectively, which are repositories that store data associated with subscribers and use that data to provide various services, some of which will be described below in the context of handoff.

The mobility management entity (MME) 228 is an LTE system entity which manages the distribution of paging messages to the eNB 212 and which is also involved in pre-registration and handoff signaling according to exemplary embodiments as described below. Additionally, according to exemplary embodiments, the MME 228 can have a co-located dormant session management function (DSMF) 230 which is used in support of a handoff of UE 10 from the LTE RAN 204 to the HRPD RAN 202. According to exemplary embodiments, the DSMF 230 is responsible for initiating different activities associated with the handover of UE 214 from the LTE RAN 204 to the HRPD RAN 202, such as, initiating pre-registration, initiating re-registration and initiating de-registration, which are described in more detail below. Additionally, using pre-registration, de-registration and re-registration the DSMF 230 is capable of limiting unnecessary registration, maintaining existing registration as the UE 214 moves within the LTE RAN 204, and updating the HRPD RAN 202 of the location of the UE 214 as needed.

It will be appreciated that the exemplary hybrid system architecture illustrated in FIGS. 2(a) and 2(b) is purely illustrative and that the following exemplary embodiments can be implemented in other architectures. For example, although the exemplary hybrid network 200 illustrates some HRPD system elements being integrated with corresponding LTE system elements, this is not required, also while the DSMF 230 is shown to be co-located with the MME 228, the DSMF 230 could be located elsewhere either as a standalone node or co-located with a different node, e.g., an eNB 212. In fact, while some exemplary embodiments below describe handoffs in the context of architectures having an integrated SAE GW/PDSN as shown in FIG. 2(a), other exemplary embodiments explicitly contemplate architectures wherein these elements are separated.

Figure 3:
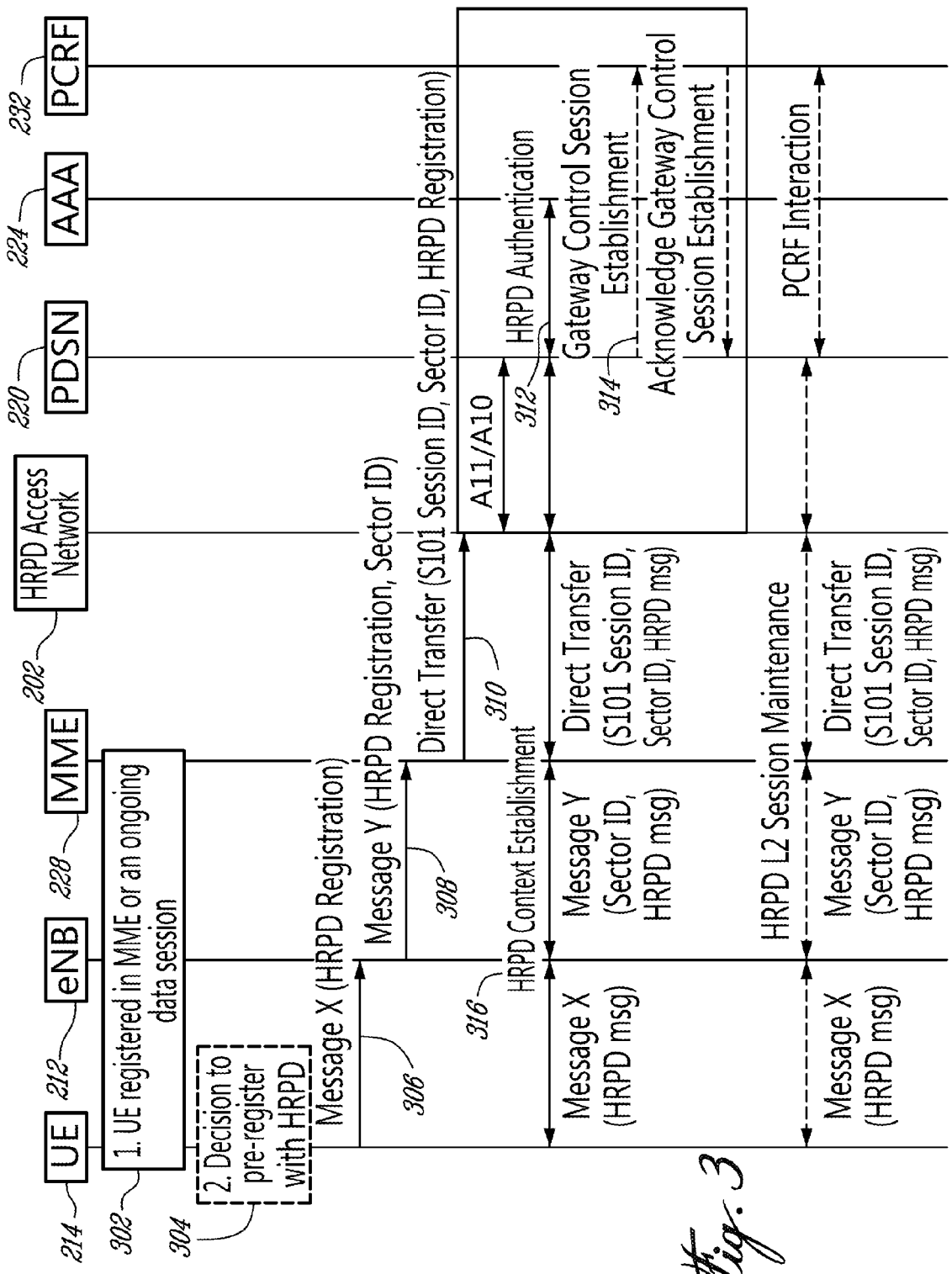
FIG. 3 illustrates signaling associated with a handoff of a user equipment (UE) from an LTE RAN to an HRPD RAN according to an exemplary embodiment.

Using the above described exemplary hybrid system architecture shown in FIGS. 2(a) and 2(b), a handoff for a UE 214 from an LTE RAN 204 to an HRPD RAN 202 will now generally be described with respect to the signaling diagram illustrated in FIG. 3. Initially, UE 214 is registered in MME 228 or it is engaged in an ongoing data session as shown in block 302. As shown in block 304, a decision is made by the UE 214 to pre-register with the HRPD RAN 202, based upon a received initiation message. As described below, according to exemplary embodiments initiation of pre-registration is performed by a DSMF 230. This pre-registration process allows the UE 214 to establish and maintain a dormant session in the HRPD RAN 202, while still being attached to the LTE RAN 204, in a manner which is controlled by a network function.

After deciding to pre-register, the UE 214 generates and sends an HRPD request message 306 to its current eNB 212 which forwards the HRPD request message information with the SectorID in message 308 to MME 228. MME 228 then forwards a direct transfer message 310, which includes information S101 Session ID, SectorID and HRPD registration message to an access node in the HRPD RAN 202. Upon receipt of the direct transfer message 310, the HRPD RAN 202 performs the steps as needed to register UE 214, e.g. authentication 312 and gateway control session establishment 314. Additionally, during this general time frame, HRPD Context Establishment 316 occurs between HRPD RAN 202 and the UE 214 with messages going through the MME 228 and eNB 212 which extract information as needed. Currently, if pre-registration occurs and a handover does not occur for UE 214, a dormant session is created, which unnecessarily ties up radiocommunication system resources. The process of pre-registration can involve creating the initial UE 214 context with the HRPD RAN 202 which can include a number of steps related to acquiring an IP address, security requirements, capability inquiry and the like. Exemplary systems and methods using the above described architecture will now be described for controlling pre-registration, reregistration and de-registration associated with UE 214 when involved in a potential handoff from an LTE RAN 204 to the HRPD RAN 202 in a manner which can reduce the occurrence of dormant sessions.

Figure 4A:
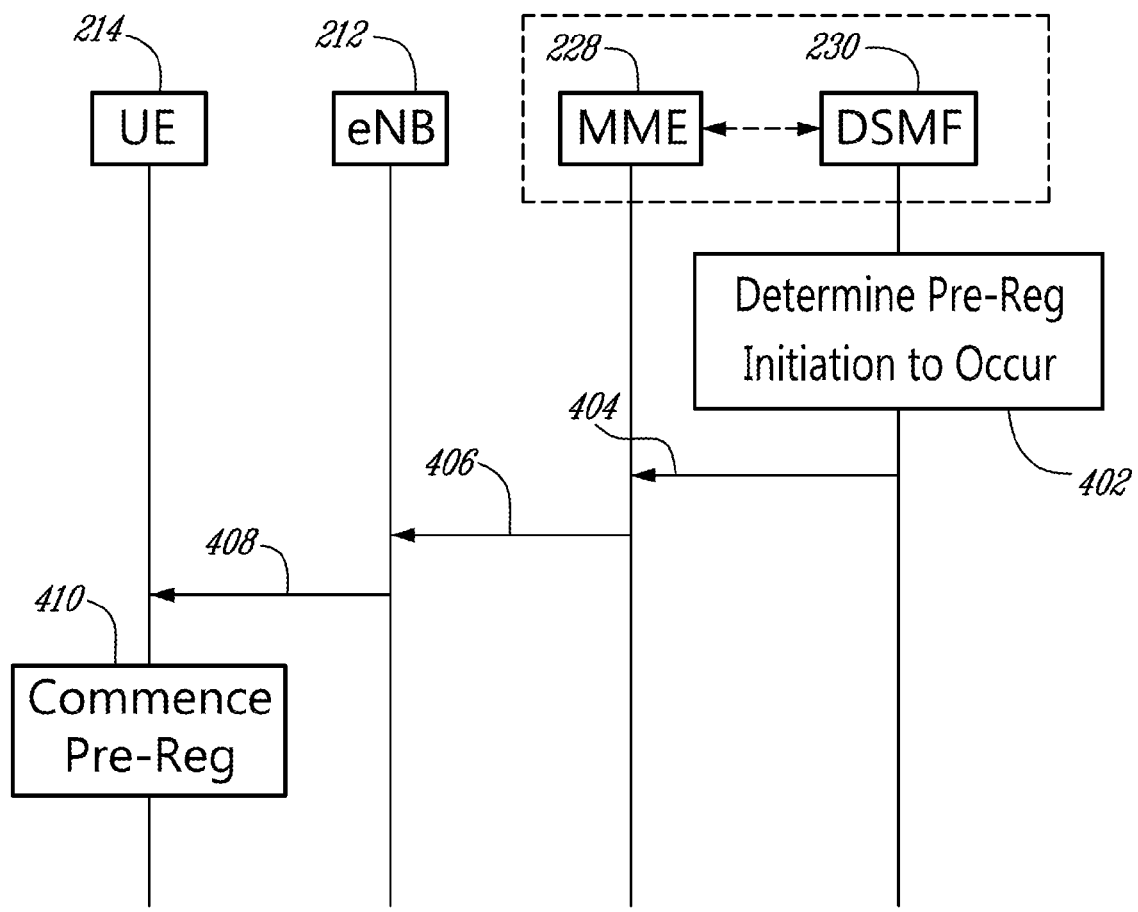
FIG. 4(a) illustrates a signaling diagram for initiation messages from a dormant session management function (DSMF) according to exemplary embodiments.

According to exemplary embodiments, when UE 214 is either registered in MME 228 or it is engaged in an ongoing data session, the decision for the UE 214 to pre-register with HRPD RAN 202 is based upon a received pre-registration initiation message. The decision to send an initiating message for pre-registration to the UE 214 is made by the DSMF 230 based upon different received inputs. Some exemplary inputs that the DSMF 230 can use for deciding to send a pre-registration initiator to UE 214 include, but are not limited to, measurements transmitted from the UE 214 to the eNB 212, which forwards the measurement information, e.g., signal strength, signal quality on the source technology, signal quality on the target technology, channel quality, distance from the source eNB, packet, block or frame error rate, carrier strength, or other signal quality measurements, on to the MME 228/DSMF 230 inputs from the operator network, e.g., pre-configured instructions, UE 214 status as known by the current eNB 212 in the communication path, target network requirements, UE 214 location and the like, Prior to discussing some exemplary combinations of inputs which are used by the DSMF 230 to determine when to send a pre-registration initiator to UE 214, a signaling diagram illustrating the communication nodes involved with these initiation messages when they occur will now be described with respect to FIG. 4(a).

Initially the DSMF 230 determines that UE 214 should pre-register with a certain HRPD RAN 202 as seen in block 402. The DSMF 230 then transmits a message 404 to MME 228, which message can include a neighbor list, the UE 214 location, and the UE 214 status, e.g., dormant or active, directing UE 214 to perform pre-registration with the specified HRPD RAN 202. The MME 228 uses the information included in message 404 and transmits, in message 406, instructions directing the UE 214 to perform pre-registration with the specified HRPD RAN 202. The eNB 212 receives message 406 from MME 228 and forwards the instructions to UE 214 in message 408. Upon receipt of message 408, the UE 214 performs pre-registration with the specified HRPD RAN 202 as shown in block 410, e.g., using the signaling shown in FIG. 3. A similar signaling flow is also used when DSMF 230 sends a message initiating the UE 214 to perform a re-registration or de-registration with HRPD RAN 202 according to other exemplary embodiments as will be described below.

Using the above described exemplary signaling in conjunction with previously received inputs, the DSMF 230 can issue initiating messages toward the UE 214 (via MME 228 and eNB 212) for pre-registration, re-registration and de-registration under different circumstances. For example, according to various pre-registration embodiments, the DSMF 230 can issue an initiating message to UE 214 for pre-registration in a first exemplary case, if the UE 214 is in an LTE_ACTIVE mode, e.g., engaged in an ongoing data session, and there is HRPD RAN 202 coverage. In this exemplary case, the DSMF 230 decides to initiate pre-registration because the LTE RAN 204 coverage is not as good as the HRPD RAN 202 coverage or, alternatively, the channel quality in the LTE RAN 204 is below a desired level. The DSMF 230 indicates its decision to initiate (or to not initiate) pre-registration for this UE 214 by including (or omitting) a neighbor access node (AN) associated with HRPD RAN 202 in a message to the MME 228

In a second exemplary case, the decision by DSMF 230 to initiate pre-registration for a given UE 214 is based upon comparing operator configurable parameters and comparing them to received information, e.g., measurements from the UE 214 and/or the timing regarding when the UE 214 moves into coverage (or close to the border of the coverage) of HRPD RAN 202. In a third exemplary case, when the UE 214 moves to a new cell, e.g., a new eNB 212, which puts the UE 214 into a position where another move could require a handoff to HRPD RAN 202 to occur, DSMF 230 can then initiate pre-registration of that UE 214. Alternatively, pre-registration can be initiated by the DSMF 230 based upon UE 214 capabilities, e.g., maximum bitrates, or based upon the services currently being used by the UE 214.

In addition to controlling pre-registration, according to other exemplary embodiments, the DSMF 230 can initiate re-registration of the UE 214 under various circumstances. In a first exemplary case, when a UE 214 is in an LTE_ACTIVE mode and changes zones, the DSMF 230 can require re-registration. This occurs by the DSMF 230 notifying the UE 214 (via MME 228 and eNB 212) of the change of zone, followed by the UE 214 obtaining a new unicast access terminal identifier (UATI). Upon session negotiation, e.g., re-registration in the new zone, the PCF informs the PDSN 220 of the new location of the UE 214. If, when changing zones, the PDSN 220 did not change, then the PDSN 220 typically clears the A10 connection and the pre-existing registration on the old AN/PCF. If the PDSN 220 did change, then the DSMF 230 will typically initiate de-registration, which will be described below in more detail, with the old AN/PCF and PDSN. In a second exemplary case, the DSMF 230 can require re-registration if the UE 214 has had a dormant session for too long of a time period, e.g., a time dormant time period pre-defined by the operator. Additionally, for this case of a long dormant session, network security requirements could require re-registration to verify that the UE 214 is authorized to be in this network.

As described above, pre-registration and re-registration initiation messages have been described as being sent as point-to-point signaling toward UE 214. According to other exemplary embodiments, these pre-registration and re-registration messages can alternatively be sent out as broadcast messages. For example, when any UE 214 moves into a new cell such that another move of the UE 214 could require a handoff to HRPD RAN 202, the DSMF 230 associated with the new cell could send out a broadcast message requiring pre-registration or re-registration. This will notify all UEs 214 in the new cell area to perform pre-registration or re-registration as appropriate.

According other exemplary embodiments, the DSMF 230 can initiate de-registration of UE 214 in various cases. De-registration, as used in this specification, refers to the UE 214 disassociating itself with the elements associated with the HRPD RAN 202, e.g., the AN/PCF and the PDSN, which frees up radiocommunication resources by ending the dormant session. In a first exemplary case, de-registration can be initiated by the DSMF 230 for CE 214 when re-registration has been required due to UE 214 changing zones and PDSNs as described above. According to a second exemplary case, when the UE 214 moves away from the coverage of HRPD RAN 202, the DSMF 230 can initiate the deregistration of UE 214. In this case, the DSMF 214 informs the UE 214 to perform de-registration by suppressing the HRPD neighbors list from the neighbor list in a message following the signaling described above with respect to FIG. 4 from the DSMF 230. According to a third exemplary case, when the UE 214 transitions into an LTE_DETACH mode, the DSMF 230 initiates de-registration. According to a fourth exemplary case, when the UE 214 enters into an LTE_IDLE mode the DSMF 230 can optionally determine to send a de-registration initiator to the UE 214, however, once the UE 214 moves away from the HRPD RAN 202 coverage, de-registration should occur as described above.

Figure 4B:
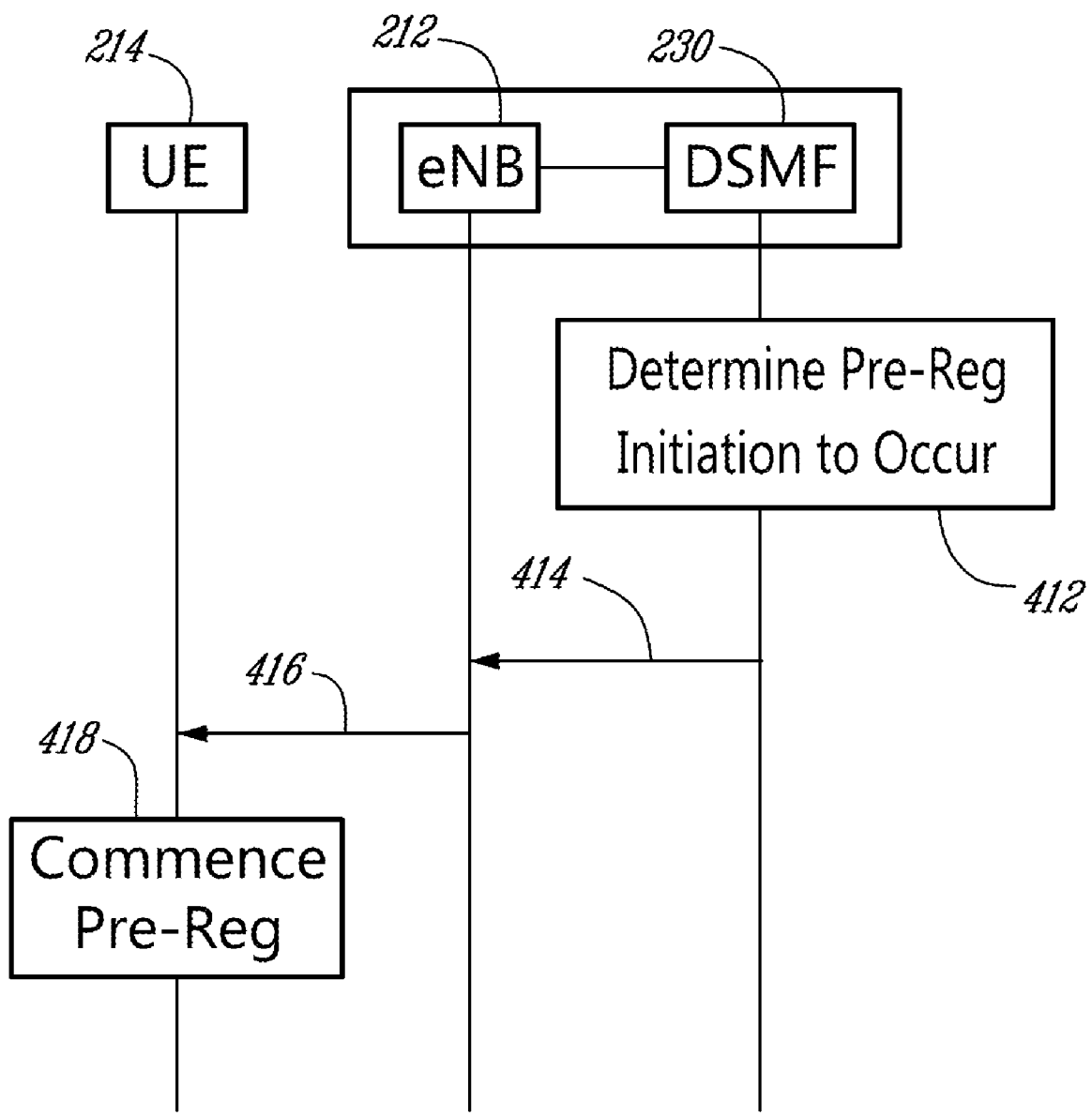
FIG. 4(b) shows a signaling diagram for initiation messages from a DSMF co-located with an evolved Node B (eNB) according to exemplary embodiments.

The above described exemplary embodiments have been described from the point of view of the DSMF 230 either being co-located with the MME 228 (as shown in dotted lines in FIG. 4(*a*)) or as a separate node in direct communications with the MME 228. According to another exemplary embodiment, the DSMF 230 can be co-located with an eNB 212. An exemplary signaling flow for this exemplary embodiment is shown in FIG. 4(*b*). Initially the DSMF 230 determines that UE 214 should pre-register with a certain HRPD RAN 202 as seen in block 402. The DSMF 230 then transmits a message 412 to eNB 212, which message can include a neighbor list, the UE 214 location, and the UE 214 status, e.g., dormant or active, directing UE 214 to perform pre-registration with the specified HRPD RAN 202. The eNB 212 then transmits a message 416 to UE 214. Upon receipt of message 416, the UE 214 performs pre-registration with the specified HRPD RAN 202 as shown in block 418, e.g., using the signaling shown in FIG. 3. A similar signaling flow is also used when DSMF 230 sends a message initiating the UE 214 to perform a re-registration or de-registration with HRPD RAN 202 according to other exemplary embodiments as previously described above.

Figure 5:
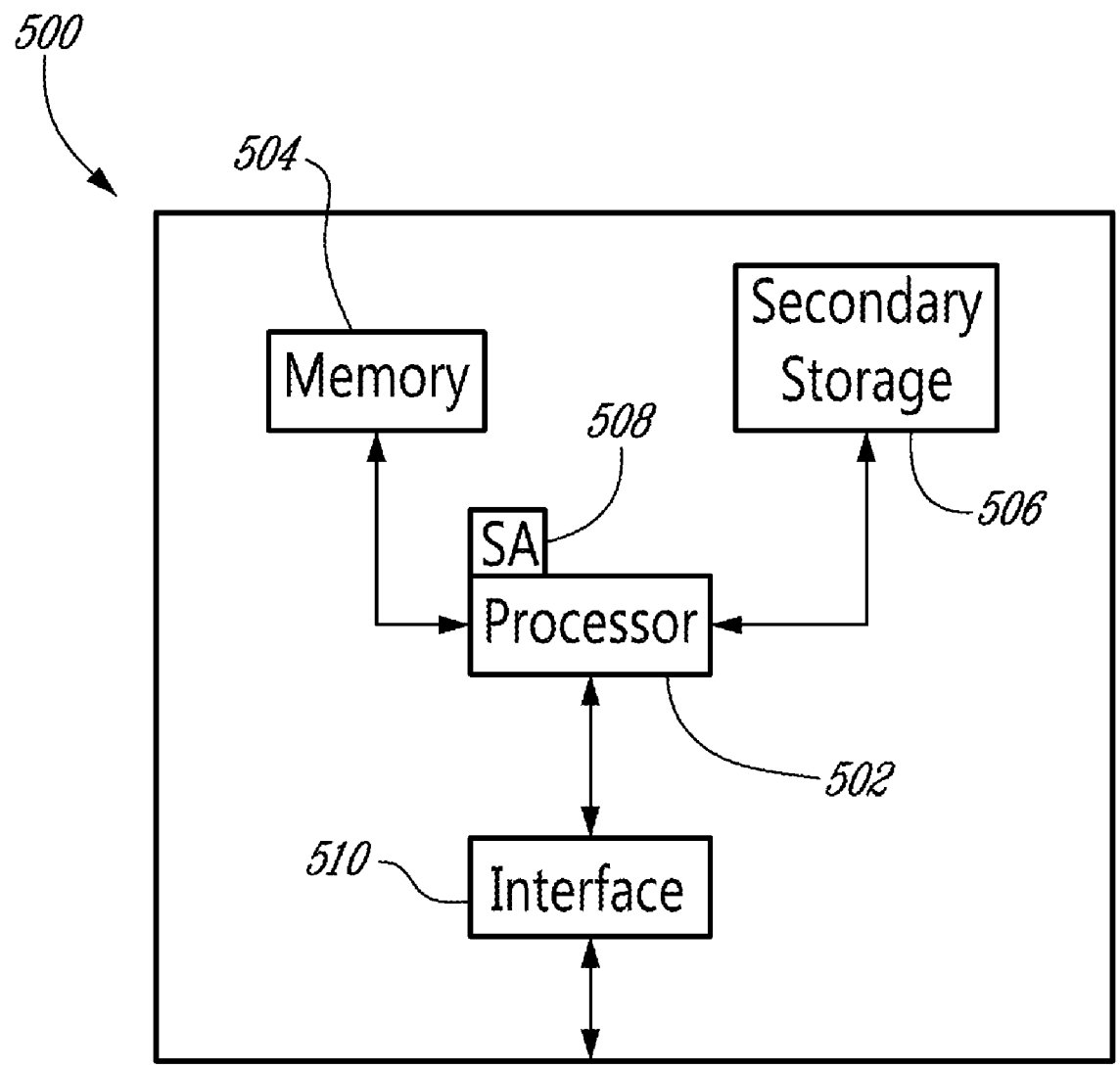
FIG. 5 illustrates a DSMF as an exemplary communication node according to an exemplary embodiment.

The exemplary embodiments described above, illustrate methods for initiating pre-registration, re-registration and de-registration for the UE 214 as determined by the DSMF 230. An exemplary communications node 500, capable of initiating pre-registration, re-registration and de-registration will now be described with respect to FIG. 5. Communication node 500 can contain a processor 502 (or multiple processor cores), memory 504, one or more secondary storage devices 506, a software application (or multiple applications) 508 and an interface unit 510 to facilitate communications between communication node 500 and the rest of the network. The memory can be used for storage of exemplary items described above such as information associated with various UEs 214 as well as pre-configured operator parameters or instructions. Thus, a communication node 500 according to an exemplary embodiment may perform the functions of a DSMF 230 and can include a processor, memory and software application(s) for determining when to initiate, and then initiating, pre-registration, re-registration and de-registration by transmitting messages to a UE 214 as described above.

Figure 6:
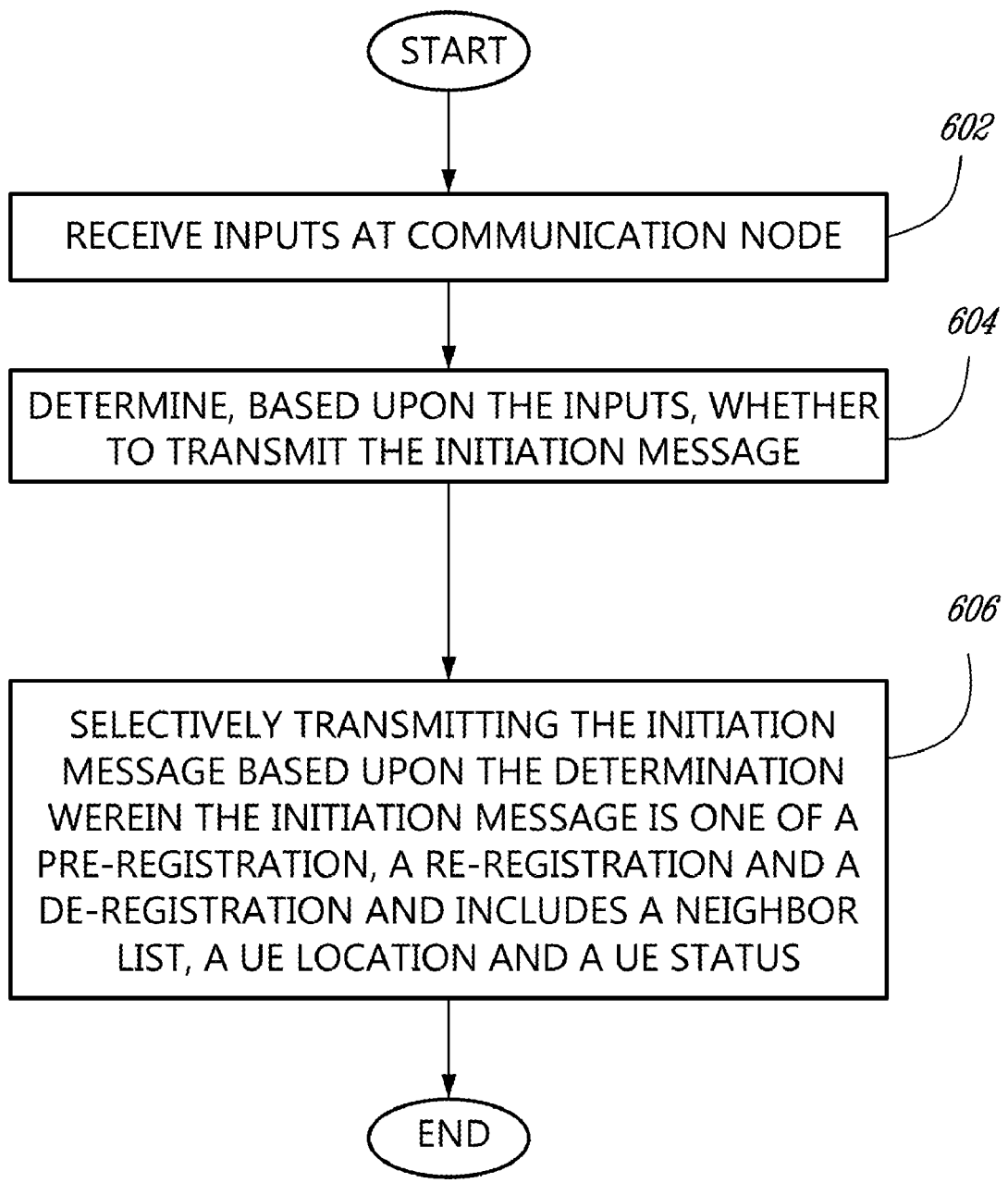
FIG. 6 shows a flow chart illustrating a method for selectively transmitting an initiation message according to an exemplary embodiment.

Utilizing the above-described exemplary techniques and systems according to exemplary embodiments, a method for selectively transmitting an initiation message is shown in the flowchart of FIG. 6. Initially a method for transmitting an initiation message, associated with handover of a user equipment (UE) from a long term evolution (LTE) radio access network (RAN) to a high rate packet data (HRPD) RAN, by a communication node includes: receiving inputs at the communication node at step 602; determining, based upon the received inputs, whether to transmit the initiation message at step 604; and selectively transmitting the initiation message based upon the determination, wherein the initiation message is one of a pre-registration, a re-registration and a de-registration message and includes a neighbor list, a UE location and a UE status, towards the UE at step 606.

Figure 7:
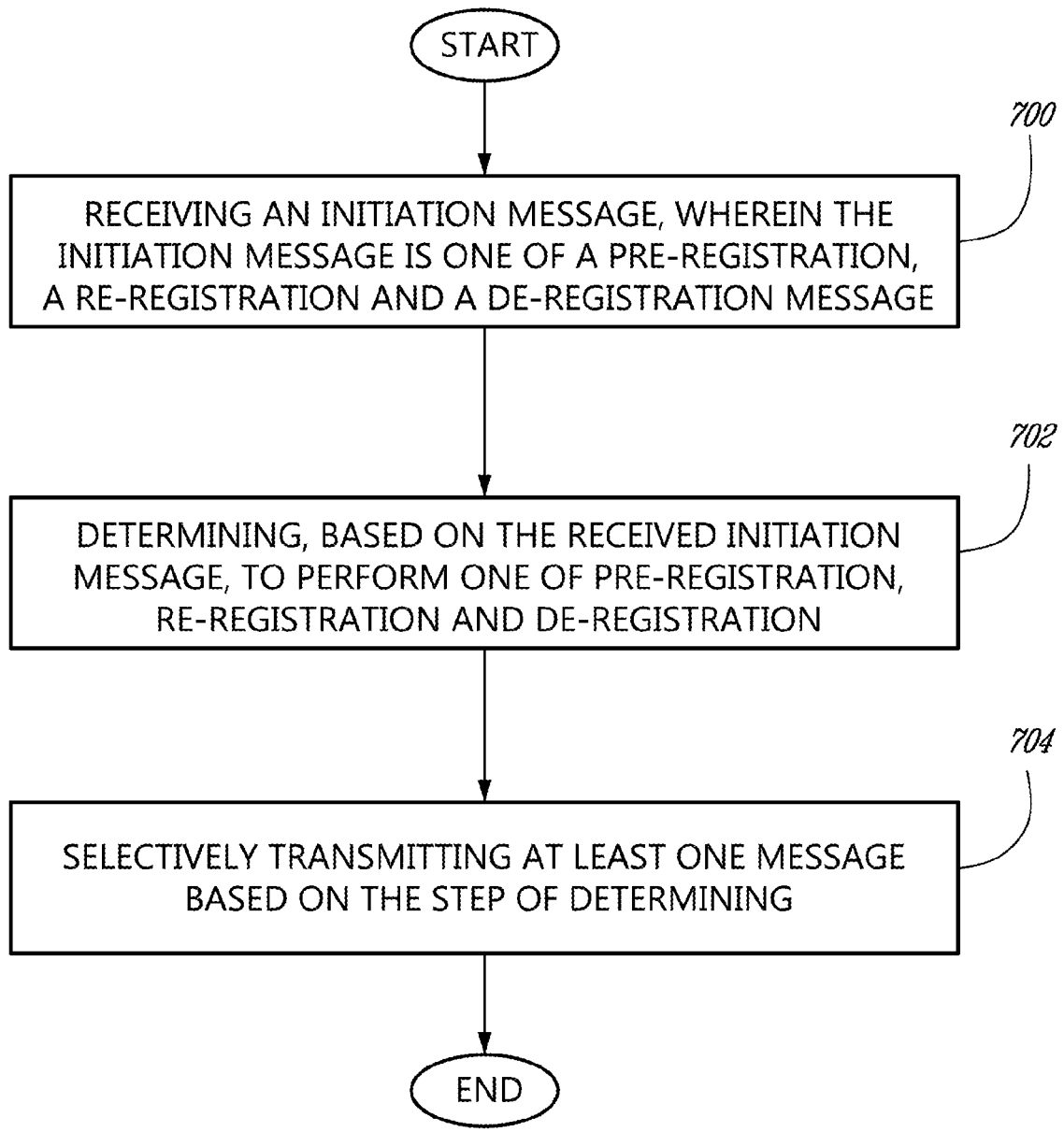
FIG. 7 is a flowchart illustrating a method for selectively transmitting a message from a user equipment (UE) according to an exemplary embodiment.
Figure 8:
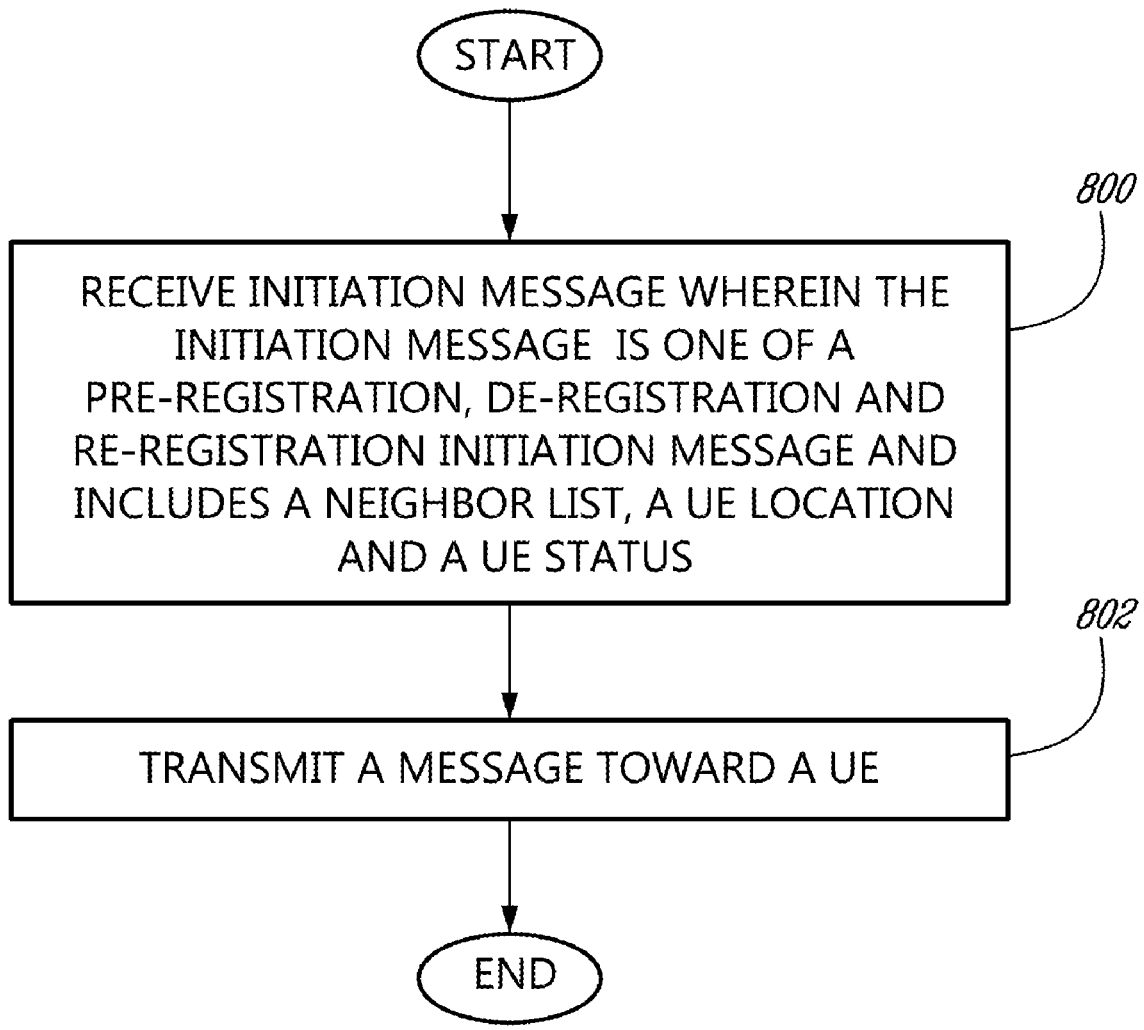
FIG. 8 is a flowchart illustrating a method for transmitting an initiation message, associated with handover of a user equipment (UE) from a long term evolution (LTE) radio access network (RAN) to a high rate packet data (HRPD) RAN, according to an exemplary embodiment.

Similarly, an exemplary method for selectively transmitting a message from a UE in communications with an LTE RAN can include the steps shown in FIG. 7. Therein, at step 700, an initiation message is received wherein the initiation message is one of a pre-registration, re-registration and de-registration initiation message. At step 702, it is determined, based on the received initiation message, to perform one of pre-registration, re-registration and de-registration. Then, at step 704, at least one message is selectively transmitted based on the step of determining. In the flowchart of FIG. 8, an exemplary method for transmitting an initiation message associated with handover of a UE from an LTE RAN to an HRPD RAN is shown. Therein, at step 800, an initiation message is received, wherein the initiation message is one of pre-registration, re-registration and de-registration initiation message and includes a neighbor list, a UE location and a UE status. A message is then transmitted, at step 802, toward the UE.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for transmitting an initiation message, associated with a handover of a user equipment (UE) from a long term evolution (LTE) radio access network (RAN) to a high rate packet data (HRPD) RAN, by a communication node comprising:
   receiving inputs at said communication node;
   determining, based upon said received inputs, whether to transmit said initiation message; and
   transmitting said initiation message based upon said determination, wherein said initiation message includes a neighbor list, a UE location and a UE status and is a pre-registration initiation message initiated when said communication node determines that said UE is in an ongoing data session and said UE is within HRPD RAN coverage and is based upon at least one of capabilities of said UE and services said UE is currently using.

2. The method of claim 1, wherein said inputs include at least one of measurements from said UE, pre-configured instructions, target network requirements and UE location.

3. The method of claim 2, wherein said measurements are at least one of signal strength, signal quality and distance.

4. The method of claim 1, wherein said initiation message is a re-registration initiation message, wherein said re-registration initiation message is initiated when said communication node determines that said UE has changed coverage zones.

5. The method of claim 1, wherein said initiation message is a de-registration initiation message, wherein said de-registration initiation message is initiated when said communication node determines that said UE moves away from coverage by said HRPD RAN.

6. The method of claim 1, wherein said communications node is a dormant session management function (DSMF).

7. The method of claim 6, wherein said DSMF is co-located with a mobility management entity (MME).

8. The method of claim 6, wherein said DSMF is co-located with an evolved Node B(eNB).

9. The method of claim 1, further comprising:
   storing said inputs at said communications node.

10. The method of claim 1, wherein said inputs are at least one of signal strength, signal quality and distance.

11. The method of claim 1, wherein said initiation message is at least one of a broadcast message and a point-to-point message.

12. A method associated with handover of a user equipment (UE) from a long term evolution (LTE) radio access network (RAN) to a high rate packet data (HRPD) RAN by a communication node comprising:
   receiving a pre-registration initiation message that includes a neighbor list, a UE location and a UE status, wherein said pre-registration message is initiated when a dormant session management function (DSMF) node determines that said UE is in an ongoing data session and said UE is within HRPD RAN coverage and based upon at least one of capabilities of said UE and services said UE is currently using; and
   transmitting a message toward said UE.

13. The method of claim 12, wherein said communication node is a mobility management entity (MME).

14. The method of claim 12, wherein said communication node is an evolved Node-B (eNB).

15. The method of claim 12, wherein said initiation message is a re-registration initiation message, wherein said re-registration initiation message is initiated when a dormant session management function (DSMF) node determines that said UE has changed coverage zones.

16. The method of claim 12, wherein said initiation message is a de-registration initiation message, wherein said de-registration initiation message is initiated when a dormant session management function (DSMF) node determines that said UE moves away from coverage by said HRPD RAN.

17. A communication node comprising:
   a communications interface for receiving inputs;
   memory for storing said inputs;
   a processor for determining, based upon said inputs, whether to transmit an initiation message, wherein said communication node selectively transmits said initiation message, and further wherein said initiation message is a pre-registration initiation message that includes a neighbor list, a user equipment (UE) location and a UE status and is transmitted when said communication node determines that said UE is in an ongoing data session and said UE is within HRPD RAN coverage and is based upon at least one of capabilities of said UE and services said UE is currently using.

18. The communication node of claim 17, wherein said inputs include at least one of measurements from said UE, pre-configured instructions, target network requirements and UE location.

19. The communication node of claim 18, wherein said measurements are at least one of signal strength, signal quality and distance.

20. The communication node of claim 17, wherein said communication node is a dormant session management function node (DSMF).

21. The communication node of claim 20, wherein said DSMF is co-located with a mobility management entity (MME).

22. The communication node of claim 20, wherein said DSMF is co-located with an evolved Node B (eNB).

23. The communication node of claim 17, wherein said initiation message is a re-registration initiation message, wherein said re-registration initiation message is initiated when said communication node determines that said UE has changed coverage zones.

24. The communication node of claim 17, wherein said initiation message is a de-registration initiation message, wherein said de-registration initiation message is initiated when said communication node determines that said UE moves away from coverage by said HRPD RAN.

* * * * *